United States Patent
Xiao

(10) Patent No.: US 11,252,151 B2
(45) Date of Patent: Feb. 15, 2022

(54) METHOD AND APPARATUS FOR DATA TRANSMISSION BETWEEN TERMINALS

(71) Applicant: TENCENT TECHNOLOGY (SHENZHEN) COMPANY LIMITED, Shenzhen (CN)

(72) Inventor: Peng Xiao, Shenzhen (CN)

(73) Assignee: TENCENT TECHNOLOGY(SHENZHEN) COMPANY LIMITED, Shenzhen (CN)

(*) Notice: Subject to any disclaimer, the term of this patent is extended or adjusted under 35 U.S.C. 154(b) by 70 days.

(21) Appl. No.: 15/981,236

(22) Filed: May 16, 2018

(65) Prior Publication Data
US 2018/0262495 A1 Sep. 13, 2018

Related U.S. Application Data

(63) Continuation of application No. PCT/CN2017/087453, filed on Jun. 7, 2017.

(30) Foreign Application Priority Data

Jun. 7, 2016 (CN) .......................... 201610397268.2

(51) Int. Cl.
*H04L 29/06* (2006.01)
*G06F 21/32* (2013.01)
*H04L 29/08* (2006.01)

(52) U.S. Cl.
CPC .......... *H04L 63/0861* (2013.01); *G06F 21/32* (2013.01); *H04L 67/141* (2013.01); *H04L 67/26* (2013.01)

(58) Field of Classification Search
CPC ... H04L 63/0861; H04L 67/141; H04L 67/26; H04L 63/0876; G06F 21/32
See application file for complete search history.

(56) References Cited

U.S. PATENT DOCUMENTS

2004/0221118 A1* 11/2004 Slater .................... G06F 21/10
711/163
2009/0119341 A1* 5/2009 Fried .................. G06F 21/6218
(Continued)

FOREIGN PATENT DOCUMENTS

CN  102271314 A  12/2011
CN  104767882 A  7/2015
(Continued)

OTHER PUBLICATIONS

International Search Report dated Aug. 23, 2017 in PCT/CN2017/087453 with English translation, 6 pages.
(Continued)

*Primary Examiner* — Farid Homayounmehr
*Assistant Examiner* — Suman Debnath
(74) *Attorney, Agent, or Firm* — Oblon, McClelland, Maier & Neustadt, L.L.P.

(57) ABSTRACT

A method of data transmission is described. Data content is acquired by processing circuitry of a first terminal. Fingerprint identity information corresponding to the data content is acquired by the processing circuitry of the first terminal. A fingerprint-based transfer request that includes the data content and the fingerprint identity information is sent to a server. In an embodiment, the fingerprint-based transfer request enables the server to establish an association relationship between the data content and the fingerprint identity information, to acquire, in response to receiving a fingerprint-based downloading request from a second terminal, target data content matching the fingerprint-based downloading request according to the association relationship, and to send the target data content to the second terminal.

14 Claims, 9 Drawing Sheets

(56) References Cited

U.S. PATENT DOCUMENTS

| | | | |
|---|---|---|---|
| 2011/0113340 A1* | 5/2011 | Miyazawa | G06F 9/445 |
| | | | 715/736 |
| 2012/0005245 A1* | 1/2012 | Ruiz-Velasco | G06F 16/166 |
| | | | 707/822 |
| 2012/0110470 A1 | 5/2012 | Mistry et al. | |
| 2012/0272336 A1* | 10/2012 | Cohen | G06F 21/10 |
| | | | 726/28 |
| 2013/0069969 A1 | 3/2013 | Chang et al. | |
| 2017/0206332 A1* | 7/2017 | Piccin | G16H 15/00 |
| 2018/0109822 A1* | 4/2018 | Grover | H04N 21/23109 |
| 2019/0289088 A1* | 9/2019 | Bazar | H04L 67/327 |

FOREIGN PATENT DOCUMENTS

| | | |
|---|---|---|
| CN | 105450426 A | 3/2016 |
| CN | 105488060 A | 4/2016 |
| CN | 106101091 A | 11/2016 |

OTHER PUBLICATIONS

Korean Office Action dated Aug. 8, 2019 in Korean Patent Application No. 10-2018-7011767 with translation.

\* cited by examiner

METHOD AND APPARATUS FOR DATA TRANSMISSION BETWEEN TERMINALS

RELATED APPLICATION

This application is a continuation of International Application No. PCT/CN2017/087453, filed on Jun. 7, 2017, which claims priority to Chinese Patent Application No. 201610397268.2, filed on Jun. 7, 2016. The entire disclosures of the prior applications are hereby incorporated by reference in their entirety.

FIELD OF THE TECHNOLOGY

The present disclosure relates to the technical field of computers, and more particularly relates to a method and apparatus for data transmission between terminals, and/or a device or a storage medium for implementing the same.

BACKGROUND OF THE DISCLOSURE

With the development of a computer technology, people increasingly communicate with each other and acquire various pieces of information via a network application. It is usually necessary to transfer and edit information, for example, as information is transferred between two terminals, or information on one of the terminals is copied and pasted to the other terminal.

Transfer and editing of information between different terminals depends on a third-party communication tool such as a short messaging service and social software. It is necessary to copy information to the third-party communication tool and then to forward the information via the third-party communication tool. As such, the forwarded information is pasted only after being copied from the third-party tool, and the operation is complicated with poor efficiency.

SUMMARY

In view of this, the embodiments of the present disclosure provide a method and apparatus for data processing (such as fingerprint-based data transmission) between terminals, a device, and a storage medium, capable of improving the convenience of transfer and sharing of data between different terminals.

Aspects of the disclosure provide a method for data processing between terminals that is applied to a terminal. A data content to be sent is acquired at a first terminal. Fingerprint identity information corresponding to the data content is acquired. A fingerprint transfer request carrying the data content and the fingerprint identity information is sent to a server. The fingerprint transfer request is used to enable the server to establish an association relationship according to the data content and the fingerprint identity information, acquire, if a fingerprint downloading request of a second terminal is received, the data content matching the fingerprint downloading request according to the association relationship, and push the data content to the second terminal.

Aspects of the disclosure provide an apparatus for data processing between terminals that is applied to a terminal. The apparatus includes a data content acquisition module, configured to acquire, at a first terminal, a data content to be sent, a fingerprint identity information acquisition module, configured to acquire fingerprint identity information corresponding to the data content, and a sending module, configured to send a fingerprint transfer request carrying the data content and the fingerprint identity information to a server. The fingerprint transfer request is used to enable the server to establish an association relationship according to the data content and the fingerprint identity information, acquire, if a fingerprint downloading request of a second terminal is received, the data content matching the fingerprint downloading request according to the association relationship, and push the data content to the second terminal.

Aspects of the disclosure provide a computer storage medium. The computer storage medium stores computer-executable instructions, and the computer-executable instructions being used for executing the method for data processing between terminals, applied to a terminal and provided in the embodiments of the present disclosure.

Aspects of the disclosure provide a terminal that includes a storage medium and a processor. The storage medium is configured to store executable instructions. The processor is configured to execute the stored executable instructions, the executable instructions being used for executing the foregoing method for data processing between terminals, applied to a terminal.

According to the method and apparatus for data processing between terminals, the storage medium and the terminal, a data content to be sent is acquired at a first terminal, fingerprint identity information corresponding to the data content is acquired, a fingerprint transfer request carrying the data content and the fingerprint identity information is sent to a server, to enable the server to establish an association relationship according to the data content and the fingerprint identity information, acquire, if a fingerprint downloading request of a second terminal is received, the data content matching the fingerprint downloading request according to the association relationship, and push the data content to the second terminal. Data processing does not depend on a third-party communication tool, fingerprint identity information is taken as a hub to facilitate transfer and processing of a data content between different terminals, and therefore convenience and high efficiency are achieved.

Aspects of the disclosure provide a method for data processing between terminals that is applied to a server. A fingerprint transfer request sent by a first terminal is received, the fingerprint transfer request carrying a data content and fingerprint identity information. An association relationship is established according to the data content and the fingerprint identity information. A fingerprint downloading request of a second terminal is received, the data content matching the fingerprint downloading request is acquired according to the association relationship, and the data content is pushed to the second terminal.

Aspects of the disclosure provide an apparatus for data processing between terminals that is applied to a server. The apparatus includes an association relationship establishment module, configured to receive a fingerprint transfer request sent by a first terminal, the fingerprint transfer request carrying a data content and fingerprint identity information, and further configured to establish an association relationship according to the data content and the fingerprint identity information. The apparatus also includes a pushing module, configured to receive a fingerprint downloading request of a second terminal, acquire the data content matching the fingerprint downloading request according to the association relationship, and push the data content to the second terminal.

Aspects of the disclosure provide a computer storage medium is provided. The computer storage medium stores computer-executable instructions, the computer-executable instructions being used for executing the method for data processing between terminals, applied to a server and provided in the embodiments of the present disclosure.

Aspects of the disclosure provide a server that includes a storage medium and a processor. The storage medium is configured to store executable instructions. The processor is configured to execute the stored executable instructions, the executable instructions being used for executing the foregoing method for data processing between terminals, applied to a server.

According to the method and apparatus for data processing between terminals, the storage medium and the server, a fingerprint transfer request sent by a first terminal is received, the fingerprint transfer request carrying a data content and fingerprint identity information; an association relationship is established according to the data content and the fingerprint identity information; and a fingerprint downloading request of a second terminal is received, the data content matching the fingerprint downloading request is acquired according to the association relationship, and the data content is pushed to the second terminal. When a fingerprint transfer request carries a data content and fingerprint identity information, a server establishes an association relationship according to the data content and the fingerprint identity information, acquires, if receiving a fingerprint downloading request of a second terminal, the data content matching the fingerprint downloading request according to the association relationship, and pushes the data content to the second terminal. Data processing does not depend on a third-party communication tool, fingerprint identity information is taken as a hub to facilitate transfer and processing of a data content between different terminals, and therefore convenience and high efficiency are achieved.

Aspects of the disclosure provide a method of data transmission. Data content is acquired by processing circuitry of a first terminal. Fingerprint identity information corresponding to the data content is acquired by the processing circuitry of the first terminal. A fingerprint-based transfer request that includes the data content and the fingerprint identity information is sent to a server. In an embodiment, the fingerprint-based transfer request enables the server to establish an association relationship between the data content and the fingerprint identity information, to acquire, in response to receiving a fingerprint-based downloading request from a second terminal, target data content matching the fingerprint-based downloading request according to the association relationship, and to send the target data content to the second terminal.

Aspects of the disclosure provide another method of data transmission. A fingerprint-based transfer request from a first terminal is received, where the fingerprint-based transfer request includes data content and fingerprint identity information. An association relationship is established by processing circuitry of an apparatus according to the data content and the fingerprint identity information. A fingerprint-based downloading request from a second terminal is received. Target data content matching the fingerprint-based downloading request is acquired by the processing circuitry of the apparatus according to the association relationship. The target data content is sent to the second terminal by the apparatus.

Aspects of the disclosure provide a non-transitory computer-readable storage medium storing computer-readable instructions, the computer-readable instructions, when executed by one or more processors of a first terminal, causing the one or more processors of the first terminal to perform at least the operations described herein. For example, data content is acquired, and fingerprint identity information corresponding to the data content is acquired. A fingerprint-based transfer request that includes the data content and the fingerprint identity information is sent to a server. In an embodiment, the fingerprint-based transfer request enables the server to establish an association relationship between the data content and the fingerprint identity information, to acquire, in response to receiving a fingerprint-based downloading request from a second terminal, target data content matching the fingerprint-based downloading request according to the association relationship, and to send the target data content to the second terminal.

DESCRIPTION OF EMBODIMENTS

Figure 1:
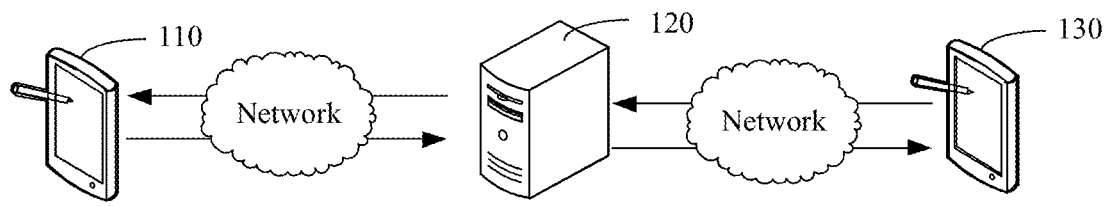
FIG. 1 is an application environment diagram of a method for data processing between terminals in an embodiment.

FIG. 1 is a diagram of an application environment where a method for data processing between terminals in an embodiment is run. As shown in FIG. 1, the application environment includes a terminal 110, a server 120 and a terminal 130, wherein the terminal 110, the server 120 and the terminal 130 communicate via a network.

The terminal 110 and the terminal 130 each include a fingerprint recognition apparatus, which may be, but not limited to, a smart phone, a tablet computer, a notebook computer or a desktop computer. The terminal 110 may send a fingerprint-based transfer request (also referred to as a fingerprint transfer request in this disclosure) and the like to the server 120 via a network, the terminal 130 may send a fingerprint-based downloading request (also referred to as a fingerprint downloading request in this disclosure) and the like to the server 120 via a network, and the server 120 may respond to the fingerprint transfer request sent by the terminal 110, acquire a matched data content, and send the data content (e.g., by pushing the data content) to a second terminal.

Figure 2:
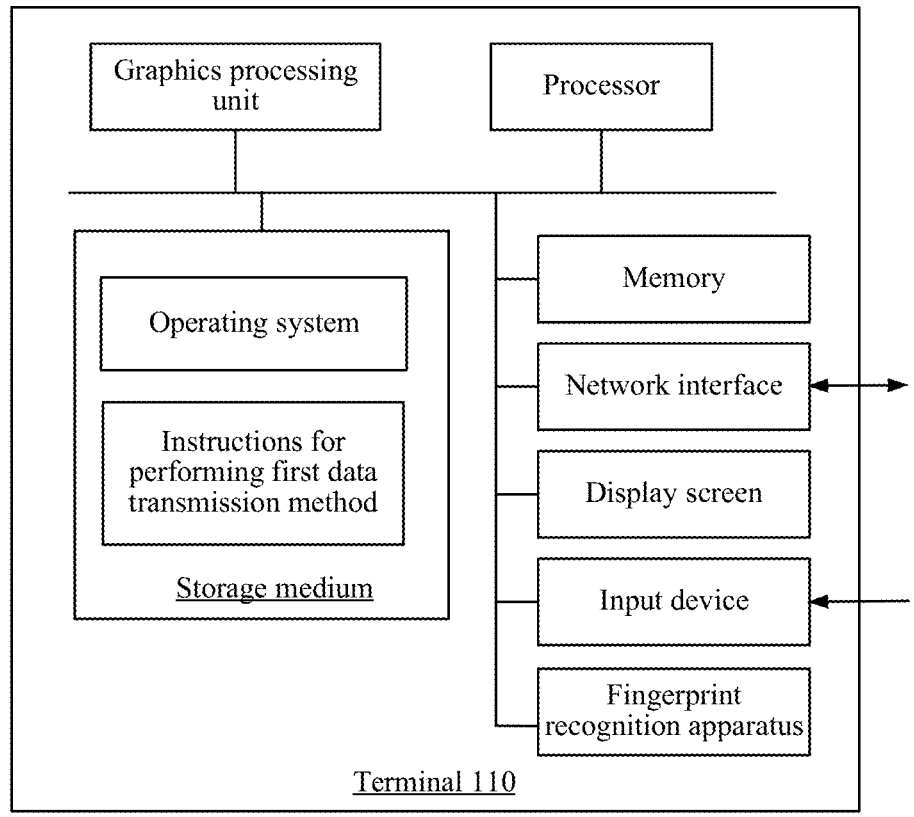
FIG. 2 is an internal structure diagram of a terminal in FIG. 1 in an embodiment.

In an embodiment, FIG. 2 shows an internal structure of the terminal 110 in FIG. 1, the terminal 110 including a processor, a graphics processing unit, a storage medium, a memory, a network interface, a display screen and an input device, connected via a system bus. The storage medium of the terminal 110 stores an operating system, and further includes instructions for performing a first data processing method between terminals, such as a method for fingerprint-based data transmission between terminals. The processor is configured to provide computation and control abilities, and supports running of the whole terminal 110. The graphics processing unit in the terminal 110 is configured to at least provide a drawing ability of a display interface, the memory provides an environment for running the apparatus for data processing between first terminals in the storage medium, and the network interface being configured to communicate with the server 120 via a network to send, for example, a fingerprint transfer request to the server 120. The display screen is configured to display an application interface and the like, and the input device includes a fingerprint recognition apparatus, the fingerprint recognition apparatus being configured to capture a fingerprint, recognize a fingerprint texture, and receive a command or data input by a user. For the terminal 110 with a touch screen, the display screen and the input device may be touch screens.

Figure 3:
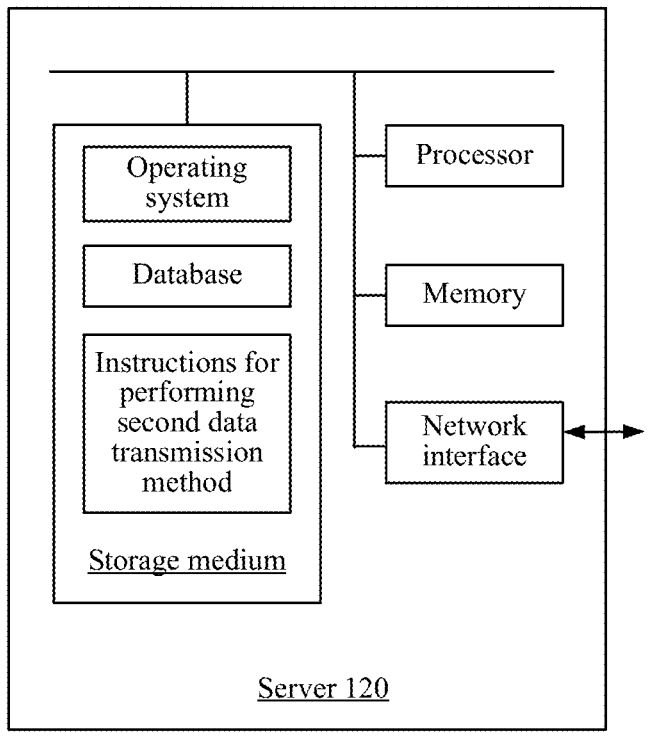
FIG. 3 is an internal structure diagram of a server in FIG. 1 in an embodiment.

In an embodiment, FIG. 3 shows an internal structure of the server 120 in FIG. 1, the server 120 including a processor, a storage medium, a memory and a network interface, connected via a system bus. The storage medium of the server 120 stores an operating system, a database and instructions for performing a second data processing method between terminals such as a method for fingerprint-based data transmission between terminals, and the database being configured to store data such as a data content and fingerprint identity information. The processor of the server 120 is configured to provide computation and control abilities, and supports running of the whole server 120. The memory of the server 120 provides an environment for running the apparatus for data processing between second terminals in the storage medium. The network interface of the server 120 being configured to communicate with the external terminal 110 and terminal 130 via a network connection, and pushes, for example, a data content and the like to the terminal 130.

Figure 4:
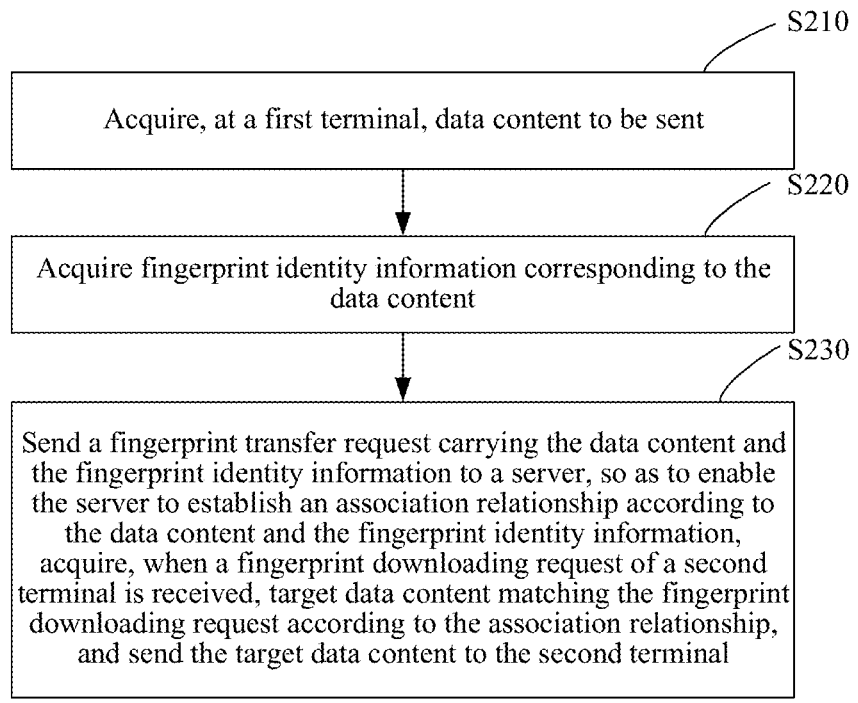
FIG. 4 is a flowchart of a method for data processing between terminals in an embodiment.

In an embodiment, as shown in FIG. 4, a method for data processing between terminals is provided. The method, illustrated with a terminal applied to the foregoing application environment, includes the following steps:

Step S210: Acquire, at a first terminal, a data content to be sent.

In other embodiments of the present disclosure, the type of the data content to be sent is not limited. The data content may be a character, a picture, a video, an audio, or mixed data of various types of data, or may be a folder or a compressed file. The data content to be sent may be selected in a selection manner.

Step S220: Acquire fingerprint identity information corresponding to the data content.

In other embodiments of the present disclosure, the fingerprint identity information for determining at least one fingerprint may be fingerprint information such as fingerprint feature information which may be a fingerprint image, a mathematical feature obtained by computation such as a formula relationship, or character information. The fingerprint identity information may also be information in corresponding relationship with a fingerprint, such as a user identifier or a terminal identifier in corresponding relationship with a fingerprint. A terminal includes a fingerprint recognition apparatus disposed, for example, at a Home key or a back side of the terminal. The type of the fingerprint recognition apparatus is not limited. The fingerprint recognition apparatus may be a capacitive fingerprint capture apparatus, which recognizes a fingerprint texture by contact between skin and a screen to obtain fingerprint feature information, and records and verifies a fingerprint.

If the fingerprint identity information is information in corresponding relationship with a fingerprint, a corresponding relationship between the information and the fingerprint may be established in advance before the data content is acquired. For example, the entered fingerprint is bound (e.g., associated) with a current terminal identifier, or a corresponding relationship between a user identifier and a user fingerprint is established. A corresponding relationship may be established between a terminal or user and a plurality of fingerprints such as a plurality of fingerprints of the same user. The user identifier for uniquely determining a user identity may be, for example, a collected user face image, a user identifier already registered in other applications or the like. The fingerprint identity information is information that corresponds to a fingerprint. The fingerprint identity information is easier to collect or acquire than the corresponding fingerprint, and is less likely to be affected by unsuccessful fingerprint feature capturing caused by the state of a finger, and therefore fast processing speed and high efficiency are achieved. If a plurality of fingerprints may be determined according to the fingerprint identity information, the data content also corresponds to the plurality of fingerprints, so that when sending a fingerprint downloading request, a second terminal can carry any one fingerprint corresponding to the data content, and the data content can be acquired more flexibly and conveniently. If a user A grants a child (user B) a downloading permission of acquiring a data content uploaded by the user A, fingerprints of the user B and the user A may be extracted and bound with the fingerprint identity information, and the data content uploaded by the user A can also be verified successfully via a fingerprint downloading request carrying the fingerprint of the user B, to facilitate sharing of downloaded data with a user (friend or relative).

If the fingerprint identity information is fingerprint information, a corresponding relationship between a data content and a fingerprint is established, wherein there may be one or more fingerprints. During data acquisition, fingerprints may be entered in real time to determine fingerprint identity information corresponding to the data content. For example, fingerprint identity information corresponding to data A is a middle-finger fingerprint feature, and fingerprint identity information corresponding to data B is an index-finger fingerprint feature.

In an embodiment, the fingerprint identity information is fingerprint feature information.

In other embodiments of the present disclosure, the fingerprint identity information is exclusive information of a fingerprint, used for uniquely determining a fingerprint. The correspondence between the data content and the fingerprint identity information provides a more direct corresponding relationship between the data content and the fingerprint.

Step S230: Send a fingerprint transfer request carrying the data content and the fingerprint identity information to a server, to enable the server to establish an association relationship according to the data content and the fingerprint identity information, acquire, if a fingerprint downloading request of a second terminal is received, the data content matching the fingerprint downloading request according to the association relationship, and push the data content to the second terminal.

In other embodiments of the present disclosure, the fingerprint transfer request may be sent via a preset virtual key, and distinguished from a common data transfer request. The fingerprint transfer request not only carries a data content to be transferred, but also carries fingerprint identity information, the fingerprint identity information being taken as a hub to facilitate transfer and processing of the data content between different terminals.

If the fingerprint identity information is information in corresponding relationship with a fingerprint, the server can acquire a fingerprint pre-bound with the fingerprint identity information and then to establish an association relationship between the data content and the fingerprint. Different fingerprints correspond to different storage spaces, and data contents are stored into spaces of fingerprints associated therewith. If the fingerprint identity information is fingerprint information, a corresponding fingerprint may be directly determined by means of the fingerprint information, and then an association relationship between a data content and a fingerprint is established. A fingerprint may be uniquely identified by a fingerprint identifier, different fingerprint features correspond to different fingerprint identifiers, and the corresponding fingerprint identifier may be determined by means of the fingerprint feature information. It may be understood that an association relationship exists, if the fingerprint identity information determines a plurality of fingerprints, between the data content and the plurality of fingerprints. An association relationship set may be established for the same user, and association relationships corresponding to different fingerprints of the same user are included in the same relationship set by taking a user identifier as an index, thereby making it convenient to rapidly search for a corresponding fingerprint via a user identifier and to determine an association relationship.

The fingerprint downloading request carries fingerprint feature information capable of uniquely determining a fingerprint corresponding to the fingerprint feature information, so that the server searches the association relationship according to the fingerprint carried in the fingerprint downloading request to judge whether identical fingerprints are present, if so, the fingerprint downloading request is verified successfully, and a data content associated with the fingerprint is acquired and sent to the second terminal by serving as pushed data. If not, the fingerprint downloading request is verified unsuccessfully, and the second terminal cannot acquire a downloaded content from the server. Fingerprint comparison verification ensures the safety of data acquisition.

The second terminal may be a terminal identical to or different from the first terminal in type, the first terminal and the second terminal may be terminals within the same space range such as a mobile phone and a computer of the same user at home, data is rapidly sent to the computer by acquiring a data content to be sent from the mobile phone and corresponding fingerprint identity information, the data content to be sent can be sent to the server and correspondingly stored with a user fingerprint by clicking a fingerprint sending key on the mobile phone, and after the computer captures the user fingerprint, corresponding associated data may be rapidly sent to the computer by verifying that the user fingerprint is present in the server. In some embodiments, only two operations are involved in the whole data transfer process, so that simplicity and high efficiency are achieved.

In the present embodiment, a data content to be sent is acquired at a first terminal, fingerprint identity information corresponding to the data content is acquired, a fingerprint transfer request carrying the data content and the fingerprint identity information is sent to a server, to enable the server to establish an association relationship according to the data content and the fingerprint identity information, acquire, if a fingerprint downloading request of a second terminal is received, the data content matching the fingerprint downloading request according to the association relationship, and push the data content to the second terminal. Data processing does not depend on a third-party communication tool, fingerprint identity information is taken as a hub to facilitate transfer and processing of a data content between different terminals, and therefore convenience and high efficiency are achieved.

In an embodiment, the data content to be sent is a data content to be copied, pasted to a corresponding location of the second terminal after being pushed to the second terminal.

Figure 5:
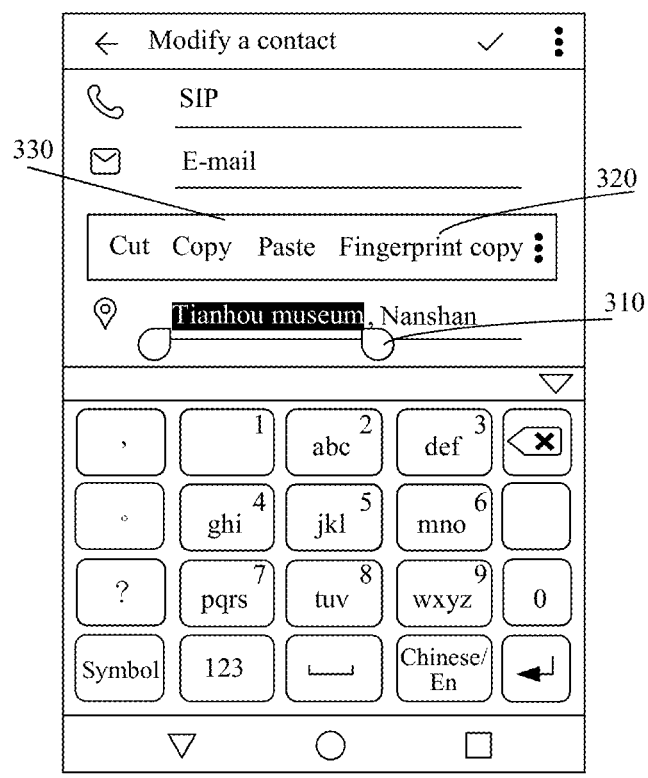
FIG. 5 is a diagram of a terminal interface copied via a fingerprint in an embodiment.

In other embodiments of the present invention, a fingerprint copying virtual key may be disposed at the first terminal and distinguished from common copying. After the data content to be sent is acquired, an operation on the fingerprint copying virtual key is received, so the data content is recognized as a data content to be copied, a data attribute of the data may be modified as TO-BE-COPIED, the data content to be copied will be pasted to a corresponding location of the second terminal, and the pasting location may be determined according to a current operation location. An operation location where the second terminal sends a fingerprint pasting request may serve as a pasting location. For example, a first operation on a fingerprint pasting virtual key is received, and data pushed by the server is pasted to a location corresponding to the first operation. In an embodiment, FIG. 5 shows a diagram of a terminal having a fingerprint-based copying and pasting function. A contact interface of the first terminal is modified to select a data content 310 to be sent, a fingerprint copying virtual key 320 and a common copying virtual key 330 are different keys, a fingerprint transfer request is triggered via the fingerprint copying virtual key 320, the attribute of the data content 310 to be sent is set as TO-BE-COPIED, and the data content to be copied and fingerprint identity information are sent to the server. Therefore, the acquiring the data content is performed by obtaining a string as the data content in response to a user input via a user interface of the terminal. The fingerprint-based transfer request that includes the fingerprint identity information and the data content is generated in response to a user operation via a user interface of the terminal. The sending the fingerprint-based transfer request to the server can be performed also in response to the user operation via the user interface of the first terminal.

Figure 6:
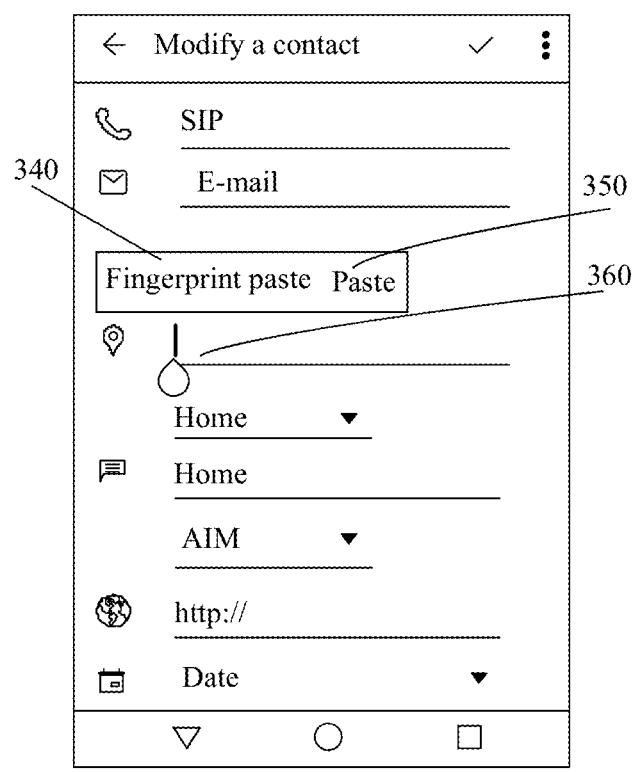
FIG. 6 is a diagram of a terminal interface pasted via a fingerprint in an embodiment.

As shown in FIG. 6, the second terminal triggers a fingerprint downloading request via a fingerprint pasting virtual key 340, the fingerprint pasting virtual key 340 and a common pasting virtual key 350 are different keys, the second terminal recognizes a fingerprint corresponding to a current operation and uploads fingerprint feature information to the server, if the server verifies that a fingerprint in the fingerprint downloading request is consistent with a fingerprint in the fingerprint transfer request, the data content to be copied is pushed to the second terminal, and the second terminal recognizes that the downloaded data content is data to be copied, and pastes the acquired data content to a current operation location 360.

Figure 7:
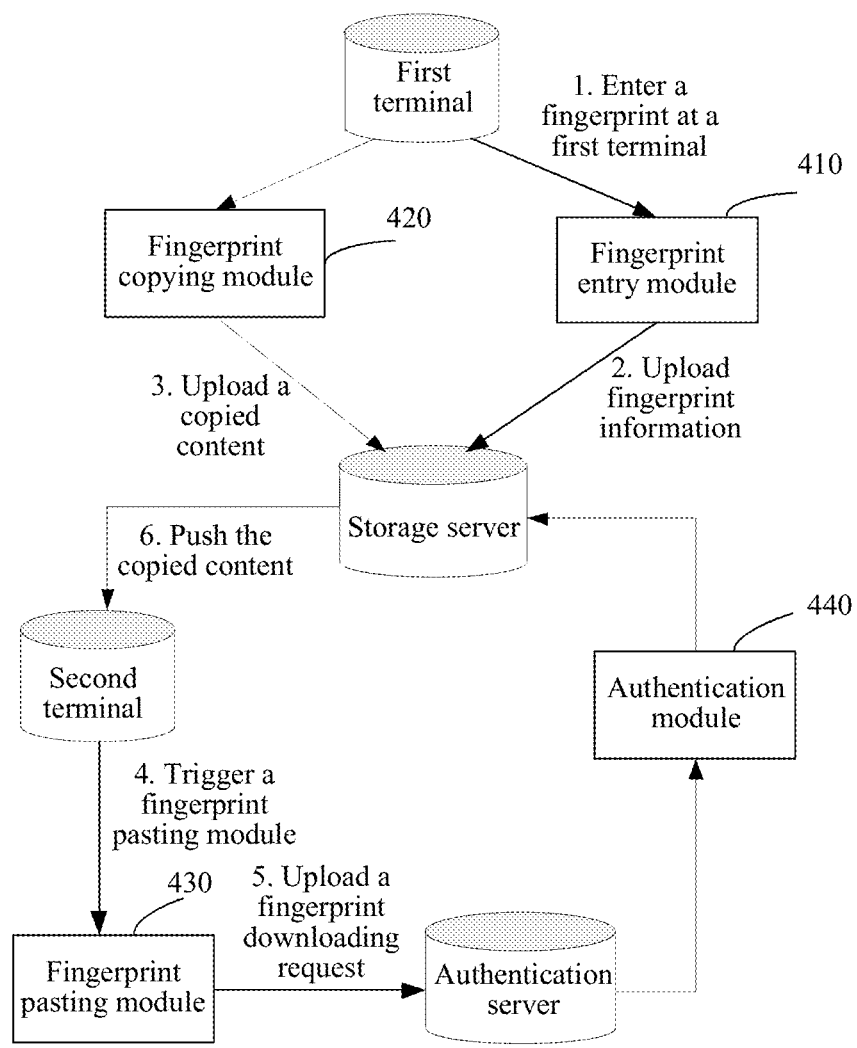
FIG. 7 is a diagram of a function module having a fingerprint-based copying and pasting function in a specific embodiment.

FIG. 7 shows, in other embodiments, a diagram of a function module having a fingerprint-based copying and pasting function. The steps of copying and pasting via each function module are as follows.

A fingerprint is entered at the first terminal via a fingerprint entry module 410, entered fingerprint information is uploaded to a storage server, and after copying a data content via the fingerprint, a fingerprint copying module 420 uploads the copied data content to the server and stores the data content to a storage space corresponding to the entered fingerprint. A fingerprint pasting module 430 is triggered at a current operation location of the first terminal, and a fingerprint downloading request is uploaded to an authentication server via the fingerprint pasting module 430, the fingerprint downloading request carrying downloaded fingerprint information; according to the data stored in the storage server, the authentication server recognizes, by means of an authentication module 440, whether the downloaded fingerprint information is consistent with the entered fingerprint information; and if so, authentication is successful, the copied data content in the storage space corresponding to the entered fingerprint is pushed to the second terminal, and the second terminal pastes and displays the data content at a corresponding location.

In an embodiment, the fingerprint identity information is a terminal identifier, and, before step S210, the method further includes: entering a first fingerprint at the first terminal, and uploading the first fingerprint to the server, to enable the server to bind (e.g., establish an association) the first fingerprint with the first terminal.

In other embodiments of the present disclosure, before a data content is sent, a first fingerprint is bound with the first terminal, so that when the data content is sent, it is unnecessary to enter a fingerprint, thereby avoiding influence on a data content sending speed caused by unsuccessful fingerprint entry due to a bad current finger state such as wetting or other reasons.

Also, step S230 includes: sending a fingerprint transfer request to a server, the fingerprint transfer request carrying the data content and the first terminal identifier, such that the server acquires a first fingerprint bound with the first terminal according to the first terminal identifier and establishes an association relationship between the data content and the first fingerprint.

In other embodiments of the present disclosure, the server acquires a first fingerprint bound with the first terminal according to the first terminal identifier, finds a storage space corresponding to the first fingerprint, and stores the data content in the storage space corresponding to the first fingerprint, to establish an association relationship between the data content and the first fingerprint. The data content can only be uploaded to a space corresponding to a pre-bound fingerprint, and even if a second user having a fingerprint other than a fingerprint bound with the first terminal uploads data, the uploaded data cannot be stored in a space corresponding to the fingerprint of the second user, thereby ensuring the exclusivity of data transfer of the first terminal.

In an embodiment, the fingerprint identity information is a user identifier, and, before step S210, the method further includes: entering a first fingerprint at the first terminal, and uploading the first fingerprint and a user identifier of a first application to the server, to enable the server to bind the first fingerprint with the user identifier.

In other embodiments of the present disclosure, before a data content is sent, a first fingerprint is bound with a user identifier, so that when the data content is sent, it is unnecessary to enter a fingerprint, and the data content may be directly sent to a space corresponding to the first fingerprint bound with the user identifier, thereby avoiding influence on a data content sending speed caused by unsuccessful fingerprint entry due to a bad current finger state such as wetting or other reasons. The user identifier may be a user identifier already registered in various applications such as a social application and an instant messaging application. Different user identifiers are bound with different fingerprints, thereby making it convenient for a plurality of users to transfer fingerprint data at one terminal via user identifiers, the users being independent of each other and not affected by each other.

Also, step S230 includes: sending a fingerprint transfer request to a server, the fingerprint transfer request carrying the data content and the user identifier, such that the server verifies a user permission according to the user identifier, acquires a first fingerprint bound with the user identifier if the user permission satisfies a fingerprint transfer permission, and establishes an association relationship between the data content and the first fingerprint.

In other embodiments of the present disclosure, different fingerprint transfer permissions may be allocated to different users in advance. For example, a permission of fingerprint data transfer is allocated according to job information of a user, or a permission of fingerprint data transfer is allocated to a user according to a relationship between the user and another user such as a mother-child relationship and a friend relationship. It may also be set that a permission of fingerprint data transfer is present as long as password authentication corresponding to a user identifier is passed. Because a user identifier in an application generally corresponds to an identity authentication password, the user identity may be authenticated by means of a password. Only when the authentication is passed, it can be say that a user permission satisfies a fingerprint transfer permission, and fingerprint data may be transferred, thereby improving the safety of fingerprint data transfer. Moreover, a user may log in different terminals via a user identifier, and check a data content corresponding to a historical fingerprint transfer request corresponding to the user identifier, thereby implementing a roaming function of checking a fingerprint transfer data content at different places and at different time periods.

Figure 8:
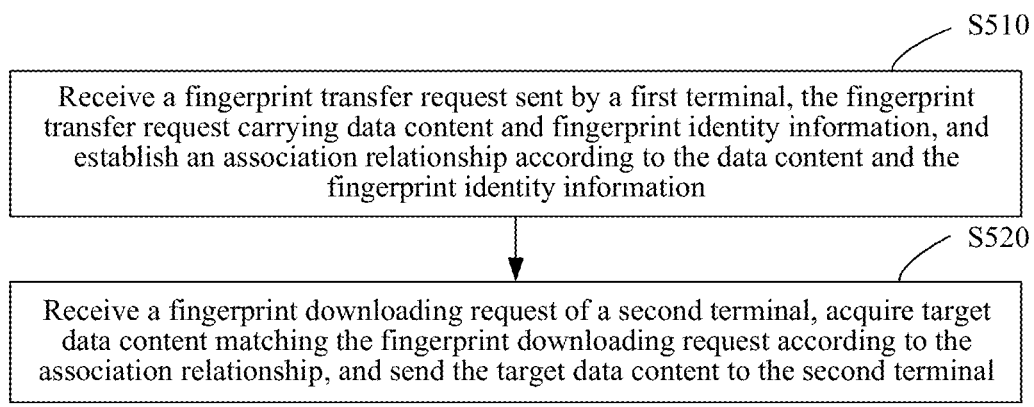
FIG. 8 is a flowchart of another method for data processing between terminals in an embodiment.

In an embodiment, as shown in FIG. 8, a method for data processing between terminals is provided. The method, illustrated with a server applied to the foregoing application environment, includes the following steps:

Step S510: Receive a fingerprint transfer request sent by a first terminal, the fingerprint transfer request carrying a data content and fingerprint identity information, and establish an association relationship according to the data content and the fingerprint identity information.

In other embodiments of the present disclosure, the fingerprint transfer request may be sent by the first terminal via a preset virtual key, and distinguished from a common data transfer request. The fingerprint transfer request not only carries a data content to be transferred, but also carries fingerprint identity information, the fingerprint identity information being taken as a hub to facilitate transfer and processing of the data content between different terminals.

The type of the data content is not limited. The data content may be a character, a picture, a video, an audio, or mixed data of various types of data, or may be a folder or a compressed file. The data content to be sent may be selected in a selection manner. The fingerprint identity information for determining at least one fingerprint may be fingerprint information such as fingerprint feature information which may be a fingerprint image or a mathematical feature obtained by computation such as a formula relationship and character information. The fingerprint identity information may also be information in corresponding relationship with a fingerprint, such as a user identifier or a terminal identifier in corresponding relationship with a fingerprint. A terminal includes a fingerprint recognition apparatus disposed at a Home key or a back side of the terminal. The type of the fingerprint recognition apparatus is not limited. The fingerprint recognition apparatus may be a capacitive fingerprint capture apparatus, which recognizes a fingerprint texture by contact between skin and a screen to obtain fingerprint feature information, and records and verifies a fingerprint.

If the fingerprint identity information is information in corresponding relationship with a fingerprint, a corresponding relationship between the information and the fingerprint may be established in advance before the data content is acquired. For example, the server binds a fingerprint entered at the first terminal with a first terminal identifier, or establishes a corresponding relationship between a user identifier and a user fingerprint. A corresponding relationship may be established between a terminal or user and a plurality of fingerprints such as a plurality of fingerprints of the same user. The user identifier for uniquely determining a user identity may be a collected user face image or the like. The fingerprint identity information is information that corresponds to a fingerprint. The fingerprint identity information is easier to collect or acquire than the corresponding fingerprint, and is less likely to be affected by unsuccessful fingerprint feature capturing caused by the state of a finger, and therefore fast processing speed and high efficiency are achieved. If a plurality of fingerprints may be determined according to the fingerprint identity information, the data content also corresponds to the plurality of fingerprints, so that when a fingerprint downloading request sent by a second terminal is received, a data content to be pushed may be determined more flexibly and conveniently by carrying any one fingerprint corresponding to the data content. When establishing an association relationship, the server can acquire a fingerprint pre-bound with the fingerprint identity information and then to establish an association relationship between the data content and the fingerprint. Different fingerprints correspond to different storage spaces, and data contents are stored into spaces of fingerprints associated therewith.

If the fingerprint identity information is fingerprint information, a corresponding relationship between a data content and a fingerprint is established, wherein there may be one or more fingerprints. During data acquisition, fingerprints may be entered in real time to determine fingerprint identity information corresponding to a data content. For example, fingerprint identity information corresponding to data A is a middle-finger fingerprint feature, and fingerprint identity information corresponding to data B is an index-finger fingerprint feature. When establishing an association relationship, the server may directly determine a corresponding fingerprint by means of the fingerprint information, and then establish an association relationship between a data content and a fingerprint. A fingerprint may be uniquely identified by a fingerprint identifier, different fingerprint features correspond to different fingerprint identifiers, and the corresponding fingerprint identifier may be determined by means of the fingerprint feature information.

It may be understood that an association relationship exists, if the fingerprint identity information determines a plurality of fingerprints, between the data content and the plurality of fingerprints. An association relationship set may be established for the same user, and association relationships corresponding to different fingerprints of the same user are included in the same relationship set by taking a user identifier as an index, thereby making it convenient to rapidly search for a corresponding fingerprint via a user identifier and to determine an association relationship.

Step S520: Receive a fingerprint downloading request of a second terminal, acquire the data content matching the fingerprint downloading request according to the association relationship, and push the data content to the second terminal.

In other embodiments of the present disclosure, the fingerprint downloading request carries fingerprint feature information capable of uniquely determining a fingerprint corresponding to the fingerprint feature information, so that the server searches the association relationship according to the fingerprint carried in the fingerprint downloading request to judge whether identical fingerprints are present, if so, the fingerprint downloading request is verified successfully, and a data content associated with the fingerprint is acquired and sent to the second terminal by serving as pushed data. If not, the fingerprint downloading request is verified unsuccessfully, and the second terminal cannot acquire a downloaded content from the server. Fingerprint comparison verification ensures the safety of data acquisition.

In the present embodiment, a fingerprint transfer request sent by a first terminal is received, the fingerprint transfer request carrying a data content and fingerprint identity information; an association relationship is established according to the data content and the fingerprint identity information; and a fingerprint downloading request of a second terminal is received, the data content matching the fingerprint downloading request is acquired according to the association relationship, and the data content is pushed to the second terminal. When a fingerprint transfer request carries a data content and fingerprint identity information, a server establishes an association relationship according to the data content and the fingerprint identity information, acquires, if receiving a fingerprint downloading request of a second terminal, the data content matching the fingerprint downloading request according to the association relationship, and pushes the data content to the second terminal. Data processing does not depend on a third-party communication tool, fingerprint identity information is taken as a hub to facilitate transfer and processing of a data content between different terminals, and therefore convenience and high efficiency are achieved.

In an embodiment, the data content to be sent is a data content to be copied, pasted to a corresponding location of the second terminal after being pushed to the second terminal.

In other embodiments of the present disclosure, the attribute of a data content to be transmitted may be set as a data content to be copied, so the server can complete copying and pasting at the first terminal and the second terminal by means of two operation steps in response to two simple requests of the terminals namely a fingerprint transfer request and a fingerprint downloading request.

In an embodiment, the fingerprint identity information is a terminal identifier, step S510 including: acquire a first terminal identifier carried in the fingerprint transfer request, acquire a first fingerprint bound with the first terminal according to the first terminal identifier, and establish an association relationship between the data content and the first fingerprint.

In other embodiments of the present disclosure, the server acquires a first fingerprint bound with the first terminal according to the first terminal identifier, finds a storage space corresponding to the first fingerprint, and stores the data content in the storage space corresponding to the first fingerprint, to establish an association relationship between the data content and the first fingerprint. The data content can only be uploaded to a space corresponding to a pre-bound fingerprint, and even if a second user having a fingerprint other than a fingerprint bound with the first terminal uploads data, the uploaded data cannot be stored in a space corresponding to the fingerprint of the second user, thereby ensuring the exclusivity of data transfer of the first terminal.

In an embodiment, the fingerprint identity information is a user identifier, step S510 includes: acquiring a user identifier carried in the fingerprint transfer request, acquiring a first fingerprint bound with the user identifier according to the user identifier, and establishing an association relationship between the data content and the first fingerprint.

In other embodiments of the present disclosure, the server acquires a first fingerprint bound with a user identifier according to the user identifier, finds a storage space corresponding to the first fingerprint, and stores the data content in the storage space corresponding to the first fingerprint, to establish an association relationship between the data content and the first fingerprint. Different user identifiers are bound with different fingerprints in advance, and the same terminal allows different users to upload data contents to spaces corresponding to different pre-bound fingerprints, thereby making it convenient for a plurality of users to transfer fingerprint data at one terminal via user identifiers, the users being independent of each other and not affected by each other.

Figure 9:
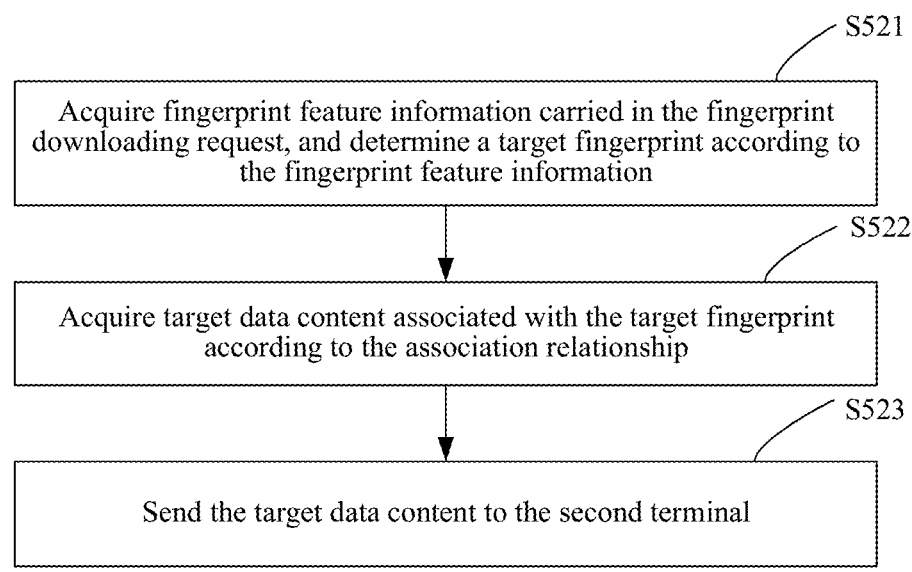
FIG. 9 is a flowchart showing pushing of a data content in an embodiment.

In an embodiment, as shown in FIG. 9, step S520 includes:

Step S521: Acquire fingerprint feature information carried in the fingerprint downloading request, and determine a target fingerprint according to the fingerprint feature information.

In other embodiments of the present disclosure, a corresponding target fingerprint may be determined by means of fingerprint feature information, the fingerprint feature information determining one or more target fingerprints.

Step S522: Acquire a target data content associated with the target fingerprint according to the association relationship.

In other embodiments of the present disclosure, a target data content is acquired in a storage space corresponding to a target fingerprint, and in the presence of a plurality of target fingerprints, a plurality of data contents may be acquired. Acquisition of a plurality of data contents may facilitate uploading of a plurality of pieces of fingerprint information by means of fingerprint recognition of a plurality of fingers, so that a plurality of data contents may be downloaded and pasted more efficiently at one time.

Step S523: Push the target data content to the second terminal.

In other embodiments of the present disclosure, one or more target data contents may be pushed to the second terminal, and pasted and displayed.

In an embodiment, the fingerprint identity information is a user identifier, before step S520 of acquiring the data content matching the fingerprint downloading request according to the association relationship, the method further includes: acquiring a user identifier carried in the fingerprint downloading request, verifying a user permission according to the user identifier, and entering the step of acquiring the data content matching the fingerprint downloading request according to the association relationship if the user permission satisfies a fingerprint downloading permission.

In other embodiments of the present disclosure, different fingerprint downloading permissions may be allocated to different users in advance, and for the same user, a fingerprint transfer permission and a fingerprint downloading permission may be different. For example, only the fingerprint transfer permission is present, whilst the fingerprint downloading permission is not present. For example, a permission of fingerprint data downloading is allocated according to job information of a user, or a permission of fingerprint data downloading is allocated to a user according to a relationship between the user and another user such as a mother-child relationship and a friend relationship. For example, children may download data uploaded by parents, and by binding a user identifier of a daughter with the fingerprint of her mother, data transferred by the mother may be downloaded via the user identifier of the daughter. It may also be set that a permission of fingerprint data downloading is present as long as password authentication corresponding to a user identifier is passed. Because a user identifier in an application generally corresponds to an identity authentication password, the user identity may be authenticated by means of a password. Only when the authentication is passed, it can be said that a user permission satisfies a fingerprint downloading permission, and fingerprint data may be downloaded, thereby improving the safety of fingerprint data downloading. Moreover, a user may log in different terminals via a user identifier, and check a data content corresponding to a historical fingerprint transfer request corresponding to the user identifier, thereby implementing a roaming function of checking a fingerprint transfer data content at different places and at different time periods.

Figure 10:
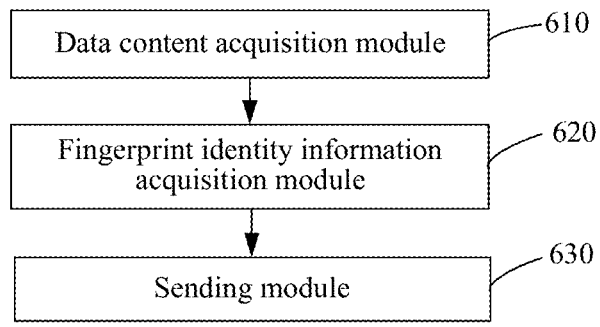
FIG. 10 is a block diagram of an apparatus for data processing between terminals in an embodiment.

In an embodiment, as shown in FIG. 10, an apparatus for data processing between terminals is provided. The apparatus includes:

a data content acquisition module 610, configured to acquire, at a first terminal, a data content to be sent;

a fingerprint identity information acquisition module 620, configured to acquire fingerprint identity information corresponding to the data content; and a sending module 630, configured to send a fingerprint transfer request carrying the data content and the fingerprint identity information to a server, to enable the server to establish an association relationship according to the data content and the fingerprint identity information, acquire, if a fingerprint downloading request of a second terminal is received, the data content matching the fingerprint downloading request according to the association relationship, and push the data content to the second terminal.

In an embodiment, the data content to be sent is a data content to be copied, pasted to a corresponding location of the second terminal after being pushed to the second terminal.

Figure 11:
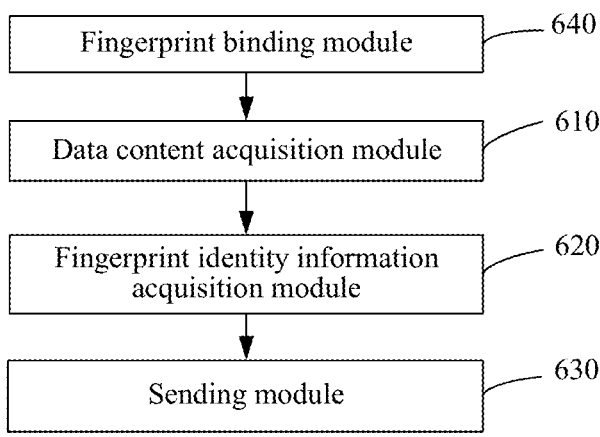
FIG. 11 is a block diagram of an apparatus for data processing between terminals in another embodiment.

In an embodiment, the fingerprint identity information is a terminal identifier, as shown in FIG. 11, the apparatus further including:

a fingerprint binding module 640, configured to enter a first fingerprint at the first terminal, and upload the first fingerprint to the server, to enable the server to bind the first fingerprint with the first terminal.

The sending module 630 is further configured to send a fingerprint transfer request to a server, the fingerprint transfer request carrying the data content and the first terminal identifier, such that the server acquires a first fingerprint bound with the first terminal according to the first terminal identifier and establishes an association relationship between the data content and the first fingerprint.

In an embodiment, the fingerprint identity information is fingerprint feature information.

Figure 12:
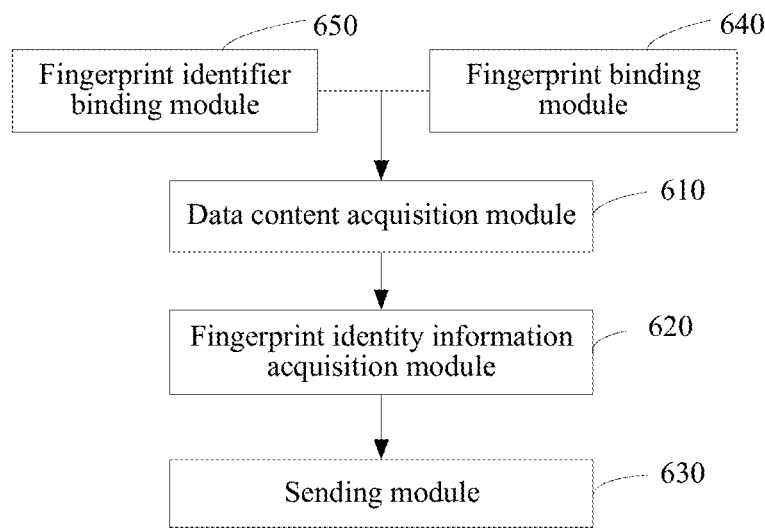
FIG. 12 is a block diagram of an apparatus for data processing between terminals in a further embodiment.

In an embodiment, the fingerprint identity information is a user identifier, as shown in FIG. 12, the apparatus further including:

a fingerprint identifier binding module 650, configured to enter a first fingerprint at the first terminal, and upload the first fingerprint and a user identifier of a first application to a server, to enable the server to bind the first fingerprint with the user identifier.

The sending module 630 is further configured to send a fingerprint transfer request to a server, the fingerprint transfer request carrying the data content and the user identifier, such that the server verifies a user permission according to the user identifier, acquires a first fingerprint bound with the user identifier if the user permission satisfies a fingerprint transfer permission, and establishes an association relationship between the data content and the first fingerprint.

Each module included in the apparatus for data processing between terminals as shown in FIG. 10 to FIG. 12 in the embodiments of the present disclosure may be implemented by means of a processor in a terminal, wherein functions implemented by the processor may also be certainly implemented by means of a logic circuit. In the implementation process, the processor may be a central processing unit (CPU), a micro processor unit (MPU), a digital signal processor (DSP) or a field programmable gate array (FPGA).

Figure 13:
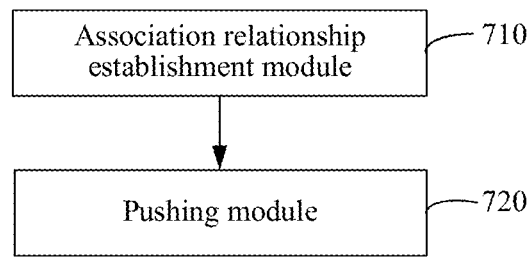
FIG. 13 is a block diagram of another apparatus for data processing between terminals in another embodiment.

In an embodiment, as shown in FIG. 13, an apparatus for data processing between terminals is provided. The apparatus includes:

an association relationship establishment module 710, configured to receive a fingerprint transfer request sent by a first terminal, the fingerprint transfer request carrying a data content and fingerprint identity information, and further configured to establish an association relationship according to the data content and the fingerprint identity information; and a pushing module 720, configured to receive a fingerprint downloading request of a second terminal, acquire the data content matching the fingerprint downloading request according to the association relationship, and push the data content to the second terminal.

In an embodiment, the data content to be sent is a data content to be copied, pasted to a corresponding location of the second terminal after being pushed to the second terminal.

In an embodiment, the fingerprint identity information is a terminal identifier or a user identifier, the association relationship establishment module 710 being further configured to acquire a first terminal identifier carried in the fingerprint transfer request, acquire a first fingerprint bound with the first terminal according to the first terminal identifier, and establish an association relationship between the data content and the first fingerprint.

Or, the association relationship establishment module 710 is further configured to acquire a user identifier carried in the fingerprint transfer request, acquire a first fingerprint bound with the user identifier according to the user identifier, and establish an association relationship between the data content and the first fingerprint.

Figure 14:
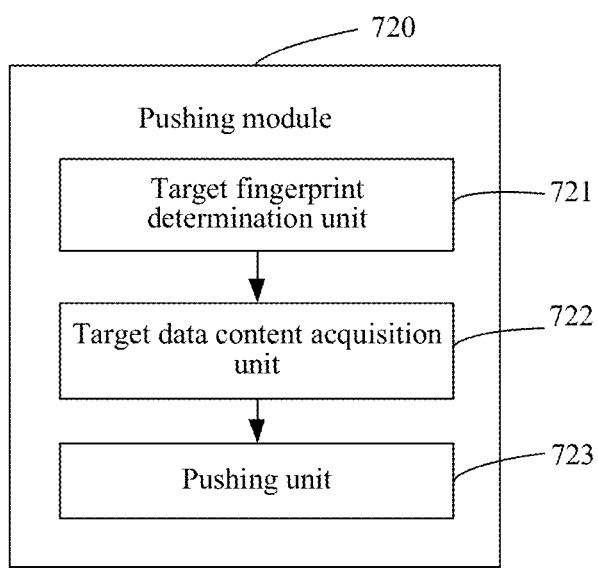
FIG. 14 is a block diagram of a pushing module in an embodiment.

In an embodiment, as shown in FIG. 14, the pushing module 720 includes:

a target fingerprint determination unit 721, configured to acquire fingerprint feature information carried in the fingerprint downloading request, and determine a target fingerprint according to the fingerprint feature information;

a target data content acquisition unit 722, configured to acquire a target data content associated with the target fingerprint according to the association relationship; and a pushing unit 723, configured to push the target data content to the second terminal.

In an embodiment, the fingerprint identity information is a user identifier, the pushing module 720 being further configured to acquire a user identifier carried in the fingerprint downloading request, verify a user permission according to the user identifier, and acquire the data content matching the fingerprint downloading request according to the association relationship if the user permission satisfies a fingerprint downloading permission.

Each module included in the apparatus for data processing between terminals as shown in FIG. 13 and FIG. 14 in the embodiments of the present disclosure may be implemented by means of a processor in a terminal, wherein functions implemented by the processor may also be certainly implemented by means of a logic circuit. In the implementation process, the processor may be a central processing unit (CPU), a micro processor unit (MPU), a digital signal processor (DSP) or a field programmable gate array (FPGA).

In the embodiments of the present disclosure, if the foregoing method for data processing between terminals is implemented in a form of software function module and sold or used as an independent product, it may also be stored in a non-transitory computer-readable storage medium. Based on this understanding, the essence of the technical solutions of the embodiments of the present disclosure may be embodied in a form of software product, the computer software product being stored in a storage medium, including a plurality of instructions used to enable a computer device (personal computer, server, or network device) to execute all or part of the method in each embodiment of the present disclosure. The foregoing storage medium includes: various media capable of storing program codes such as a U disk, a USB flash memory drive, a mobile hard disk, a Read Only Memory (ROM), a magnetic disk or an optical disk. Thus, the embodiments of the present disclosure are not limited to combination of any specific hardware and software.

Correspondingly, the embodiments of the present disclosure also provide a computer storage medium having computer-executable instructions stored therein, the computer-executable instructions being used for executing the method for data processing between terminals, applied to a server or a server and provided in the embodiments of the present disclosure.

The embodiments of the present disclosure also provide a terminal, including:

a storage medium, configured to store executable instructions; and a processor, configured to execute the stored executable instructions, the executable instructions being used for executing the foregoing method for data processing between terminals, applied to a terminal.

The embodiments of the present disclosure also provide a server, including:

a storage medium, configured to store executable instructions; and a processor, configured to execute the stored executable instructions, the executable instructions being used for executing the foregoing method for data processing between terminals, applied to a server.

A person of ordinary skill in the art may understand that all or some of flows in the foregoing embodiment method may be completed by instructing relevant hardware via a computer program, wherein the program may be stored in a non-transitory computer-readable storage medium. For example, in the embodiments of the present disclosure, the program may be stored in a storage medium of a computer system and executed by at least one processor in the computer system, to implement the flow including each of the foregoing method embodiments. The storage medium may be a magnetic disk, an optical disk, a Read-Only Memory (ROM) or a Random Access Memory (RAM).

All technical features of the foregoing embodiments may be combined randomly. For a brief description, all possible combinations of the technical features in the foregoing embodiments are not described. However, as long as the combinations of these technical features do not contradict each other, they should be regarded as a scope recorded in the present specification.

The foregoing embodiments only describe several implementation manners of the present disclosure, and their description is specific and detailed, but cannot therefore be understood as a limitation to the patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

INDUSTRIAL APPLICABILITY

In the embodiments of the present disclosure, a data content to be sent is acquired at a first terminal, fingerprint identity information corresponding to the data content is acquired, and a fingerprint transfer request is sent to a server, the fingerprint transfer request carrying the data content and the fingerprint identity information, such that the server establishes an association relationship according to the data content and the fingerprint identity information, acquires, if receiving a fingerprint downloading request of a second terminal, the data content matching the fingerprint downloading request according to the association relationship, and pushes the data content to the second terminal. Data processing does not depend on a third-party communication tool, fingerprint identity information is taken as a hub to facilitate transfer and processing of a data content between different terminals, and therefore convenience and high efficiency are achieved.

What is claimed is:

1. A method of data transmission, comprising:
    acquiring, by processing circuitry of a first terminal, a string that is selected by a first user operation highlighting the string displayed on a screen of the first terminal;
    in response to the string being selected by the first user operation, displaying a virtual key on the screen of the first terminal corresponding to triggering a fingerprint-based transfer of the string; and
    in response to a second user operation on the virtual key, performing the fingerprint based transfer of the string, including:
        acquiring, by the processing circuitry of the first terminal, fingerprint identity information specifying fingerprint information of a finger of a user; and
        sending, by the first terminal, a fingerprint-based transfer request that includes the string and the fingerprint identity information to a server, the fingerprint-based transfer request enables the server to establish an association relationship between the string and the fingerprint information of the user, to acquire, in response to receiving a fingerprint-based downloading request from a string input interface of a second terminal, the string matching the fingerprint information included in the fingerprint-based downloading request according to the association relationship, and to send, in response to the fingerprint-based downloading request, the string to the string input interface of the second terminal.

2. The method according to claim 1, wherein
    the fingerprint identity information includes a terminal identifier of the first terminal,
    the method further comprises, before the acquiring, by the first terminal, the string:
        obtaining the fingerprint information by the first terminal; and
        sending the fingerprint information to the server to be associated with the terminal identifier at the server, and
    the fingerprint-based transfer request further enables the server to acquire the fingerprint information associated with the terminal identifier and to establish the association relationship between the string and the fingerprint information.

3. The method according to claim 1, wherein
    the fingerprint identity information includes a user identifier,
    the method further comprises, before the acquiring, by the first terminal, the string:
        obtaining the fingerprint information by the first terminal; and
        sending the fingerprint information and the user identifier to a server to be associated with the user identifier at the server, and
    the fingerprint-based transfer request further enables the server to determine a user permission according to the user identifier, to acquire the fingerprint information associated with the user identifier when the user permission satisfies a fingerprint-based transfer permission, and to establish the association relationship between the string and the fingerprint information.

4. The method according to claim 1, wherein the fingerprint identity information includes the fingerprint information that includes fingerprint feature information.

5. The method according to claim 4, wherein the fingerprint feature information includes a fingerprint image, a mathematical feature, or character information.

6. The method according to claim 1, wherein the first terminal is the second terminal.

7. A method of data transmission, comprising:
    receiving a fingerprint-based transfer request from a first terminal, the fingerprint-based transfer request including a string and fingerprint identity information specifying fingerprint information of a finger of a user, the string being displayed on a screen of the first terminal and selected by a first user operation highlighting the string displayed on the screen of the first terminal, and the fingerprint-based transfer request being sent by the first terminal in response to a second user operation on a virtual key displayed on the screen in response to the string being selected by the first user operation, the virtual key corresponding to triggering a fingerprint-based transfer of the string;
establishing, by processing circuitry of an apparatus, an association relationship between the string and the fingerprint information of the user;
receiving a fingerprint-based downloading request from a string input interface of a second terminal;
acquiring, by the processing circuitry of the apparatus, the string matching the fingerprint information included in the fingerprint-based downloading request according to the association relationship; and
sending, by the apparatus, the string to the string input interface of the second terminal.

8. The method according to claim 7, wherein
the fingerprint identity information includes a terminal identifier or a user identifier, and
the establishing the association relationship between the string and the fingerprint information including:
acquiring the fingerprint information that is associated with the terminal identifier or the user identifier extracted from the fingerprint identity information; and
establishing the association relationship between the string and the fingerprint information.

9. The method according to claim 7, wherein
the fingerprint identity information includes a user identifier, and
the method further comprises, before the acquiring the string matching the fingerprint information included in the fingerprint-based downloading request according to the association relationship:
acquiring a target user identifier included in the fingerprint-based downloading request;
determining whether a user permission according to the target user identifier satisfies a downloading permission; and
perform the acquiring the string matching the fingerprint information included in the fingerprint-based downloading request according to the association relationship when the user permission is determined to satisfy the downloading permission.

10. A non-transitory computer-readable storage medium storing computer-readable instructions, the computer-readable instructions, when executed by one or more processors of a first terminal, causing the one or more processors of the first terminal to perform:
acquiring a string that is selected by a first user operation highlighting the string displayed on a screen of the first terminal;
in response to the string being selected by the first user operation, displaying a virtual key on the screen of the first terminal corresponding to triggering a fingerprint-based transfer of the string; and
in response to a second user operation on the virtual key, performing the fingerprint-based transfer of the string, including:
acquiring fingerprint identity information specifying fingerprint information of a finger of a user; and
sending a fingerprint-based transfer request that includes the string and the fingerprint identity information to a server, the fingerprint-based transfer request enables the server to establish an association relationship between the string and the fingerprint information of the user, to acquire, in response to receiving a fingerprint-based downloading request from a string input interface of a second terminal, the string matching the fingerprint information included in the fingerprint-based downloading request according to the association relationship, and to send, in response to the fingerprint-based downloading request, the string to the string input interface of the second terminal.

11. The non-transitory computer-readable storage medium according to claim 10, wherein
the fingerprint identity information includes a terminal identifier of the first terminal,
the stored computer-readable instructions, when executed by the one or more processors, further cause the one or more processors to perform, before the acquiring the string:
obtaining the fingerprint information by the first terminal; and
sending the fingerprint information to the server to be associated with the terminal identifier at the server, and
the fingerprint-based transfer request further enables the server to acquire the fingerprint information associated with the terminal identifier and to establish the association relationship between the string and the fingerprint information.

12. The non-transitory computer-readable storage medium according to claim 10, wherein
the fingerprint identity information includes a user identifier,
the stored computer-readable instructions, when executed by the one or more processors, further cause the one or more processors to perform, before the acquiring the string:
obtaining the fingerprint information by the first terminal; and
sending the fingerprint information and the user identifier to a server to be associated with the user identifier at the server, and
the fingerprint-based transfer request further enables the server to determine a user permission according to the user identifier, to acquire the fingerprint information associated with the user identifier when the user permission satisfies a fingerprint-based transfer permission, and to establish the association relationship between the string and the fingerprint information.

13. The non-transitory computer-readable storage medium according to claim 10, wherein the fingerprint identity information includes the fingerprint information that includes fingerprint feature information.

14. The non-transitory computer-readable storage medium according to claim 13, wherein the fingerprint feature information includes a fingerprint image, a mathematical feature, or character information.

* * * * *